Figure 1:
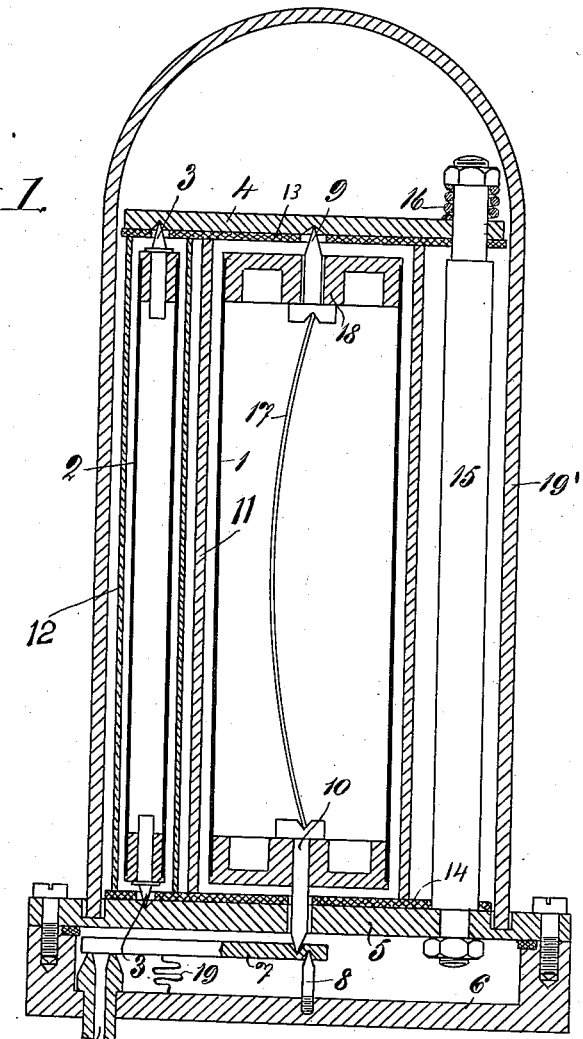

G. DALÉN.
AUTOMATICALLY OPENING AND CLOSING VALVES.
APPLICATION FILED JULY 20, 1907.

939,986.

Patented Nov. 16, 1909.

3 SHEETS—SHEET 1.

WITNESSES

INVENTOR
Gustaf Dalén
By Wm. Wallace White
ATT'Y.

G. DALÉN.
AUTOMATICALLY OPENING AND CLOSING VALVES.
APPLICATION FILED JULY 20, 1907.

939,986.

Patented Nov. 16, 1909.
3 SHEETS—SHEET 2.

WITNESSES

INVENTOR
Gustaf Dalén
By Nu Nallau White
ATT'Y

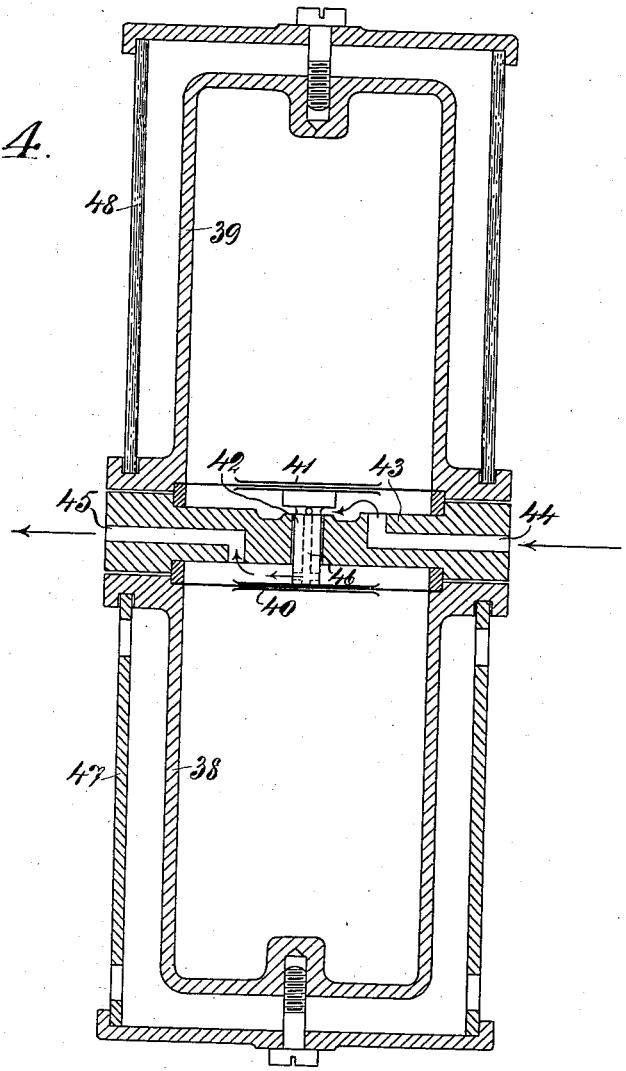

UNITED STATES PATENT OFFICE.

GUSTAF DALÉN, OF STOCKHOLM, SWEDEN, ASSIGNOR, BY MESNE ASSIGNMENTS, TO AMERICAN GASACCUMULATOR COMPANY, A CORPORATION OF NEW JERSEY.

AUTOMATICALLY OPENING AND CLOSING VALVES.

939,986.  Specification of Letters Patent.  Patented Nov. 16, 1909.

Application filed July 20, 1907.  Serial No. 384,839.

*To all whom it may concern:*

Be it known that I, GUSTAF DALÉN, a subject of the King of Sweden, and resident of Stockholm, Sweden, have invented certain new and useful Improvements in Automatically Opening and Closing Valves, of which the following is a specification.

The present invention has for its object a device, by means of which a gas conduit can be opened or shut by the influence of light in such a manner, that the gas conduit will be shut in broad day light, but opened in darkness.

The invention is especially employable for light buoys, light houses and similar signal apparatus, which up to date have been burning day and night, but which in fact need to burn only in darkness. According to the present invention such an apparatus can be caused to extinguish automatically on broad day light, and to burn on darkness or in cloudy weather. It will be clear that by this means a considerable saving of the quantity of gas, necessary for the working of the apparatus, is obtained, whereas the security of the working of the signal apparatus is completely maintained, the arrangement being such, that the signal apparatus accidentally may continue to burn when it possibly could be extinguished, but that the same on the contrary can not be extinguished, when it must burn.

The invention is characterized by the arrangement of at least two bodies, which may be solid, liquid or gaseous, and which are arranged in such a manner that they get unequal temperatures by the influence of light and thereby expand unequally. For this purpose if the two bodies are solid one of them may be made light-reflecting and the other light-absorbing. If the bodies are liquid or gaseous, they may be inclosed each within a vessel, of which one is light-reflecting and the other light-absorbing. Or one of the bodies may be exposed to the light rays, whereas the other body is protected by a screen or a covering. One of the bodies or its vessel or the two bodies or their vessels may also be surrounded by coverings, which are light-reflecting and light-absorbing respectively. It is essential that the bodies or their vessels by the influence of light receive and maintain unequal temperatures, whereby they also expand unequally. The bodies are by mechanical or electrical means in such a manner connected with a valve or the like inserted in the gas conduit, that the valve is kept closed owing to said unequal expansion, but that the same opens, when the light and consequently said difference of temperature and expansion of the bodies disappears. Employing said essential characteristics of the invention a multitude of constructional forms, all belonging to the invention, can be constructed.

On the accompanying drawings some constructions are shown in order to illustrate the invention.

Figure 2:
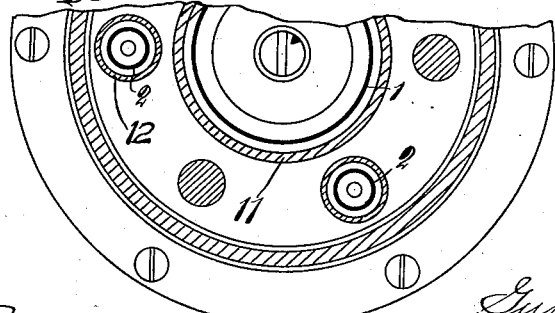
Figure 3:
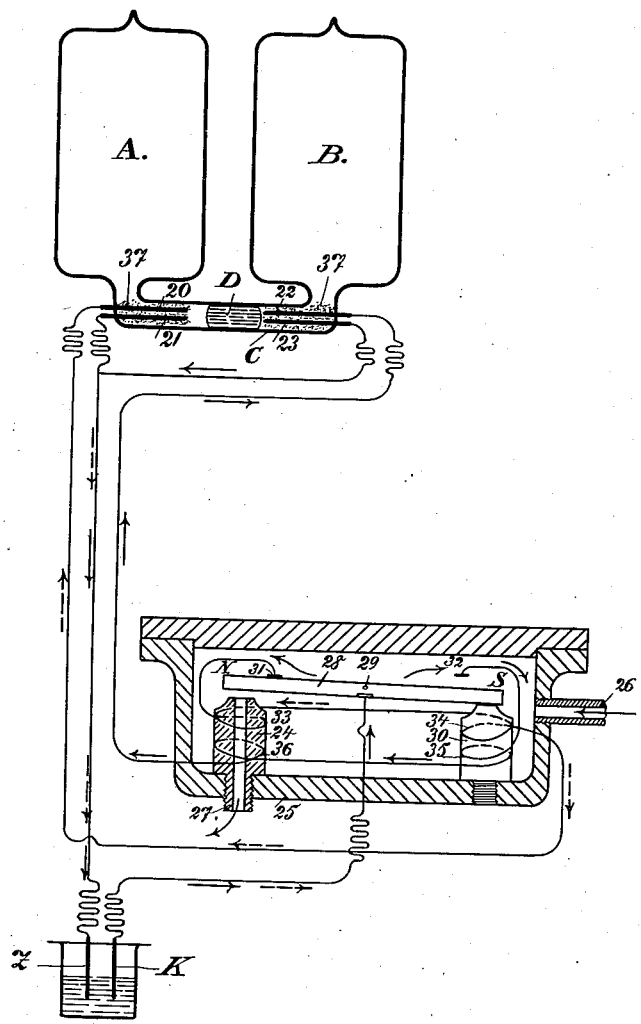

Figure 1 is a longitudinal section of an apparatus, in which solid bodies are employed and Fig. 2 is a horizontal section of the same. Fig. 3 is a schematic view, partly in section, of an apparatus, in which gaseous bodies are employed in connection with electric means for operating the valve. Fig. 4 is a vertical section of an apparatus, in which gaseous bodies are employed in connection with mechanical means for operating the valve.

In Figs. 1 and 2 1 indicates a central metallic cylinder, the surface of which in any suitable manner, for instance by means of lamp-black, is made light-absorbing. Concentrically around the cylinder 1 a number of other cylinders 2 are arranged, the surfaces of which in any suitable manner are made light-reflecting. The said cylinders are by means of points 3 inserted between an upper movable plate 4 and a lower fixed plate 5, closing a casing 6, in which the valve to be opened and closed by the present device, is inclosed. The valve is composed of a plate 7, which is suspended on one or more points or edges 8. The cylinder 1 is by means of points or edges 9 and 10 inserted between the said upper plate 4 and the valve 7, conveniently at a place near its point of suspension. The cylinders 1 and 2 may be surrounded by protecting glasses 11, 12, and insulating plates 13, 14 prevent the transmission of heat from the plates 4 and 5 to the chambers around the cylinders 1 and 2. Bolts 15 hold the plates 4 and 5 together with a pressure determined by springs 16. A spring 17 is inserted between V-shaped grooves in the heads of the points 9 and 10, of which points the one, 9, freely passes the cover 18 of the cylinder 1, for the purpose described below. A protecting covering 19' surrounds the whole apparatus.

The working of the apparatus is as follows:—In the position of the parts, shown on the drawing, the valve 7 is closed. If now darkness comes on, the light-absorption on the surface of the cylinder 1 is diminished and consequently the cylinder 1 will gradually receive the same temperature as the cylinders 2. Thus the cylinder 1 will contract more than the cylinders 2, whereby the relative position of the parts, shown on the drawing, is no longer maintained, but the distance between the points 9 and 10 is diminished, which results in opening the valve by the action of the spring 19. The gas, flowing into the chamber within the casing 6 through a conduit (not shown on the drawing) thus can escape through the valve to the place of consumption, for instance to the main burner, of a signal apparatus, so that the signal flame is lighted by means of a small constantly burning lighting flame in the previously well known manner. If now the apparatus is subjected to sunlight or broad day light, when the valve is open, the cylinder 1 will absorb the light rays in a higher degree than the cylinders 2, whereby the cylinder 1 will be warmer and expand more than the cylinders 2. The distance between the points 9 and 10 will thus be augmented, which results in closing the valve 7 and shutting off the flow of gas to the place of consumption.

The closing of the valve plate 7 is effected solely by the pressure exerted against it by means of the point 10, the latter being in contact with the said valve plate as shown in Fig. 1. The point 9 passes loosely through the cover 18, so that, if the cylinder 1 is heated sufficiently to cause the said cylinder to expand longitudinally a sufficient extent to move the cover 18 through a greater distance than the point 9, under the influence of the spring 17, is permitted to move by the cover 4, the said cover 18 may move relatively to said point 9.

Variations of the temperature of the air surrounding the apparatus will effect an expansion or contraction of the cylinder 1, which is as large and rapid as the expansion or contraction of the cylinder 2. The plate 4 will be lifted or lowered by these movements, but the valve 7 is not influenced thereby.

In the apparatus shown in Fig. 3 A and B indicate two vessels of a suitable material, connected with one another through a pipe C which, in the construction shown, is inclined from A toward B. The surface of one of the vessels, for instance A, is made light-reflecting, whereas the surface of the other vessel B is made light-absorbing. A suitable index D, for instance a body or column of mercury, is inclosed in the pipe C. On both sides of said index two electric contacts 20, 21, 22, 23 are inserted in the pipe C.

A valve body 24 is inclosed in a casing 25, provided with a gas supply pipe 26 and a gas outlet 27 through the valve body 24, leading to a burner (not shown). A valve plate 28 rocks on the pin 29 in such a manner, that in one position of the plate the valve 24 is open and the end of the plate opposite the said valve abuts against a stud 30, and the end portion of the plate adjacent the said valve simultaneously abuts against an electric contact 31, whereas the end portion of the plate 28 adjacent the stud 30 has moved from another contact 32. When the plate 28 abuts against the valve 24, closing this latter, the contact at 31 is interrupted, whereas the contact at 32 is closed. The contact 31 is connected with a coil 33 on the valve 24, which coil 33 is connected with a coil 34 on the stud 30 and connected with the contact 20 in the pipe C. The contact 32 is connected with a second coil 35 on the stud 30, said coil 35 being connected with a second coil 36 on the valve 24 conducting to the contact 22 in the pipe C. The contacts 21 and 23 are both connected with the one pole Z of an electric source, the second pole K of which is connected with the valve plate 28 or with contacts connecting with the same and applied opposite the contacts 31, 32. The valve plate 28 suitably constitutes a permanent magnet with north end at N and south end at S. The valve body 24 and the stud 50 are made of soft iron or other magnetic material.

In the position shown on the drawing the mercury index D abuts against the contacts 22 and 23 and the valve 24 is open. The electric circuit is not closed, the circuit from K and the plate 28 being interrupted at 32, whereas the circuit from K and 28 through the contact 31, the coils 33 and 34 leads to 20, where the circuit also is interrupted. Thus when D abuts against 22 and 23 the valve is not operated. This will be the case as long as the gas or air inclosed in the vessel A has the same temperature as the gas or air inclosed in B owing to equal temperatures of the vessels A and B, which will be the case at darkness, the pipe C being arranged in such a manner, for instance inclined toward B, that the index of itself abuts against the contacts 22 and 23. At broad day light or at sun light B will be more heated than A owing to its light-absorbing property, whereby the gas or air in B is expanded and moves the mercury index D over to the contacts 20, 21. The circuit through coils 33, 34 is thereby closed and the passage of an electric current therethrough will magnetize the valve 24 and the stud 30.

The direction of the current is indicated by dotted lines. Said coils 33, 34 are wound in such a direction, that a south pole is generated in the upper end of 24 as well as of 30. Consequently the north end N of the valve 24 is attracted, whereas simultaneously the stud 30 repels the south end S of the valve plate, whereby the position of the valve plate is reversed and the valve closed. During said reversion of the position of valve plate the contact at 31 is interrupted, whereas the contact 32 is closed, whereby the said circuit is interrupted. The valve plate 28 remains however in its position owing to the working of the magnetism. This position is maintained, that is, the valve is kept closed, as long as the pressure in B is higher than the pressure in A, that is, as long as B owing to the light-absorption, is kept warmer than A. But if darkness or cloudy weather comes on, A and B assume the same temperatures and the air in B receives the same pressure as the air in A. The mercury index D thus takes the position shown on the drawing, connecting the contacts 22 and 23. However as now contact is established at 32 the circuit will take its way as indicated by full drawn arrows through the coils 35 and 36 and the contacts 22, 23, whereby now north pole is generated in the upper ends of 24 and 30, the coils 35 and 36 being wound in opposite direction to the coils 33, 34. Thus the south end S of the plate 28 is attracted to the stud 30, whereas simultaneously its north end N is repelled by the valve 24, so that this latter is opened and the plate 28 assumes the position shown on the drawing. The contact 31 is thus closed and the contact 32 interrupted, in which position the electric source is out of the circuit.

For the object of avoiding too long a pipe C, which would be necessary for enabling a large movement of the index D, when the vessel B is much heated, plugs 37 of a porous or granular material are inserted into the pipe, permitting the passage of the air or gas, but preventing the mercury to penetrate longer than to the contacts 20, 21, 22, 23. By this means the distance which the index D has to move at each variation of the light intensity can be made small, and the apparatus be rapidly working.

In the apparatus according to Fig. 4 38 and 39 indicate two castings, which, respectively, are closed by the diaphragms 40, 41, between which is inserted a piece 42, serving as a valve. In the partition wall 43 between the casings 38 and 39 is provided a gas supply passage-way 44 opening into the space between the diaphragm 41 and the partition wall 43. In the piece 42 is bored a channel 46, opening in the side surface of the piece at both its ends. The casing 38 is surrounded by a covering 47 of an opaque material, whereas the casing 39 is surrounded by a transparent covering 48.

In the position of the parts shown on the drawing communication is established between the channels 44 and 45 through the channel 46 in the piece 42, and the burner is thus supplied with gas from the channel 45, so that the flame is burning. If now the casing 39 is subjected to light rays, the gas in the casing 39 will be more heated than the gas in the casing 38, which is protected from the light rays by the covering 47, owing to which fact the diaphragm and thus the piece 42 are moved downward, so that the end of the channel 46, opening in the space between the diaphragm 41 and the partition wall 43 is closed by the wall of the hole, through which the piece 42 passes. The gas supply to the burner is thus shut off, so that the flame will be extinguished. If darkness comes on, the diaphragm will again assume the position shown on the drawing. Variations of temperature do not exert influence upon the position of the valve-piece 42, such variations only resulting in variations of the pressure in the casings 38 and 39, which variations are equal in both casings.

The cylinders 1 and 2 on the vessels A and B or the casings may be surrounded by a light-reflecting and light-absorbing covering respectively instead of being themselves light-reflecting and light-absorbing.

It may be noted that the arrangements shown and described only serve as examples for operating a valve in a conduit, leading to a burner by means of the expansion and contraction of solid or gaseous bodies owing to light variations, and that the invention is not limited to the constructional forms shown. The movement of the cylinder 1 Figs. 1 and 2 may also be employed for opening or closing an electric circuit, by means of which an electro-magnet actuating the valve is influenced for opening or closing the valve or for opening and closing the same.

Having now particularly described and ascertained the nature of the said invention and in what manner the same is to be performed I declare that what I claim is:—

1. In a device for automatically opening and closing a valve in a conduit, the combination with two bodies adapted to be unequally expanded by the influence of light, of means connecting the bodies with the valve so as to operate the valve and actuated by said unequal expansion.

2. In a device for automatically opening and closing a valve in a conduit the combination with two solid bodies adapted to be unequally expanded by influence of light, of means connecting the bodies with the valve so as to operate the valve and actuated by said unequal expansion.

3. In a device for automatically opening and closing a valve in a conduit the combination with two solid bodies, one of which is light-reflecting whereas the other is light-absorbing, of means connecting the bodies with the valve so as to operate the valve and actuated by the unequal expansion of the bodies by influence of light.

4. In a device for automatically opening and closing a valve in a conduit, the combination with two solid bodies, one of which is light-reflecting whereas the other is light-absorbing, of mechanical means connecting the bodies with the valve so as to operate the valve and actuated by the unequal expansion of the bodies by influence of light.

5. In a device for automatically opening and closing a valve in a conduit the combination with a light-reflecting solid body inserted between a fixed and a movable part of the apparatus of a light-absorbing solid body inserted between said movable part and a valve plate.

6. In a device for automatically opening and closing a valve in a conduit the combination with a light-reflecting metallic cylinder inserted on points between a fixed and a movable spring actuated plate, of a light-absorbing metallic cylinder, inserted on points between said movable plate and a spring actuated valve plate, rocking on points.

7. In a device for automatically opening and closing a valve in a conduit the combination with a central metallic light-absorbing cylinder inserted on points between a movable spring actuated plate and a spring actuated valve plate, of metallic light-reflecting cylinders, inserted on points between a fixed plate and said movable plate, said cylinders being located at points outside of the central cylinder.

8. In a device for automatically opening and closing a valve in a conduit the combination with a light-reflecting metallic cylinder inserted on points between a fixed and a movable spring actuated plate, of a light-absorbing metallic cylinder, inserted on spring actuated points, of which one is movable in relation to the cylinder, between said movable plate and a spring actuated valve plate.

In testimony, that I claim the foregoing as my invention, I have signed my name in presence of two subscribing witnesses.

GUSTAF DALÉN.

Witnesses:
 WALDEMAR BOMAN,
 I. EKEBOHN.